United States Patent [19]

Knobloch

[11] Patent Number: 5,449,184
[45] Date of Patent: Sep. 12, 1995

[54] SNOWMOBILE DOLLY WITH ANTI-KICKBACK CONTROL

[76] Inventor: Denis A. Knobloch, P.O. Box 56, Alvord, Iowa 51230

[21] Appl. No.: 293,080

[22] Filed: Aug. 19, 1994

[51] Int. Cl.⁶ .................................................. B60T 1/14
[52] U.S. Cl. .................................. 280/79.11; 188/21; 188/5
[58] Field of Search .................... 188/5, 6, 7, 8, 19, 188/21, 174, 110; 180/182; 280/79.11, 33.994

[56] References Cited

U.S. PATENT DOCUMENTS

| | | | |
|---|---|---|---|
| 3,361,437 | 1/1968 | Loftis | 188/5 |
| 3,881,740 | 5/1975 | Johnson et al. | 280/79.11 |
| 3,897,959 | 8/1975 | Haffner | 280/79.11 |
| 4,376,545 | 3/1983 | Sandorf | 188/6 X |
| 4,386,788 | 6/1983 | Krob | 188/5 |
| 5,035,445 | 7/1991 | Poulin | 188/5 |

Primary Examiner—Robert J. Oberleitner
Assistant Examiner—Lee W. Young

[57] ABSTRACT

A combination of a snowmobile with its carrying dolly in which the dolly is provided with a leg-like mechanism engageable with the propulsion track of the snowmobile as the snowmobile is loaded onto or unloaded from the dolly. This engagement causes the leg to contact the surface on which the dolly stands, thus acting as a brake to hold the dolly in position during the processes of loading and unloading.

7 Claims, 2 Drawing Sheets

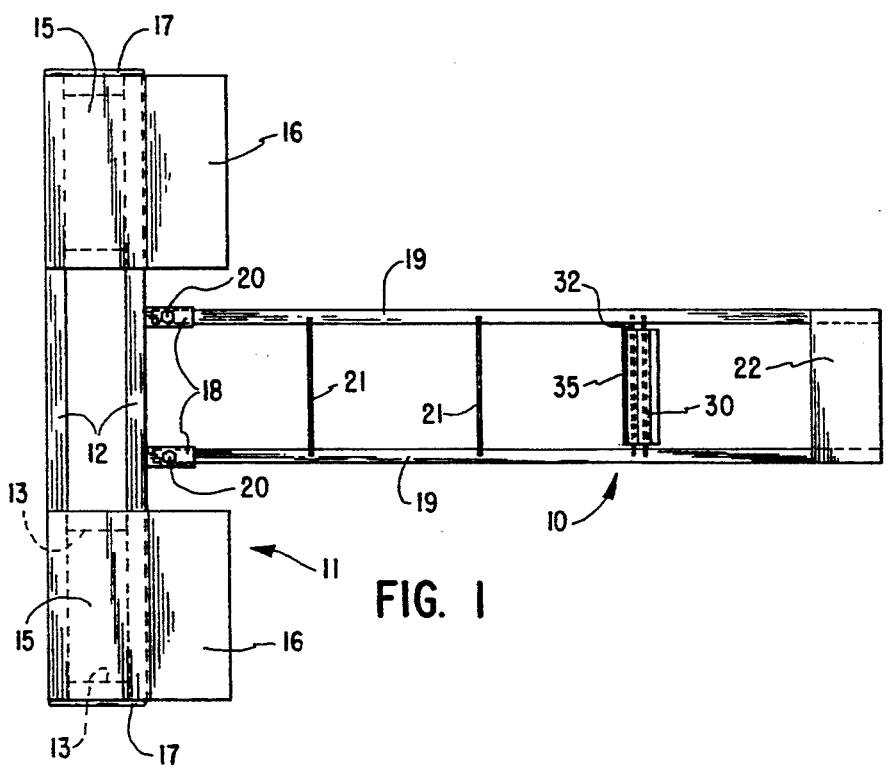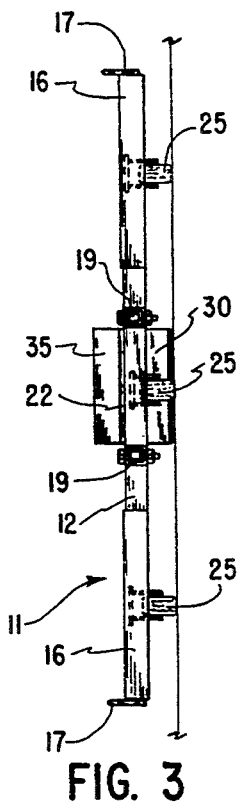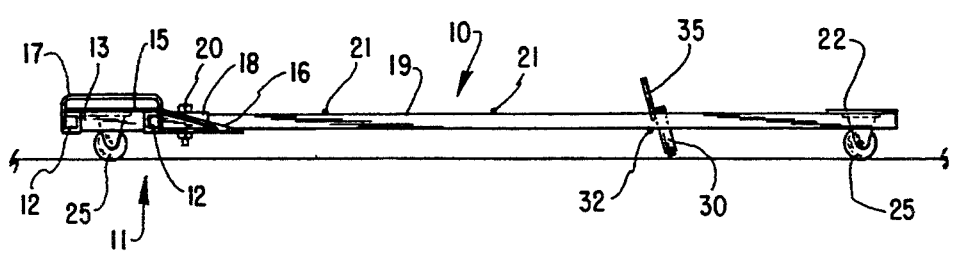

SNOWMOBILE DOLLY WITH ANTI-KICKBACK CONTROL

BACKGROUND AND SUMMARY OF THE INVENTION

This invention pertains to carrying devices, particularly carrying dollies for the machines known commonly as snowmobiles. Such dollies are common. They consist of a T-shaped bed on which the snowmobile rests. The two front skis of the snowmobile rest on pads on the cross member of the T-shape, and the powered track or belt rests on the upright of the T-shape. Casters are used to allow the dolly and its load to be readily moved for storage or the like.

Problems arise in driving the machine off the dolly. Snowmobiles commonly have no reverse gears so they are driven forwardly off the dolly. As the skis move from the pads and drop to the supporting surfaces, there is a tendency for the driving belt on the machine to drive the supporting dolly back and for the casters to simply allow the dolly to roll rapidly on the floor to the rear of the snowmobile. This action can endanger people or property standing to the rear of the dolly.

The present invention provides a mechanism by which the dolly can be frictionally inhibited from rolling on the supporting surface so that the snowmobile can be unloaded without that danger.

BRIEF DESCRIPTION OF THE DRAWINGS

FIG. 1 is a top plan view of a snowmobile-carrying dolly having the anti-kickback device in place, FIG. 2 is a side elevational view of the device of FIG. 1

FIG. 3 is an end elevational view of the device of FIG. 1,

DESCRIPTION

Figure 4:
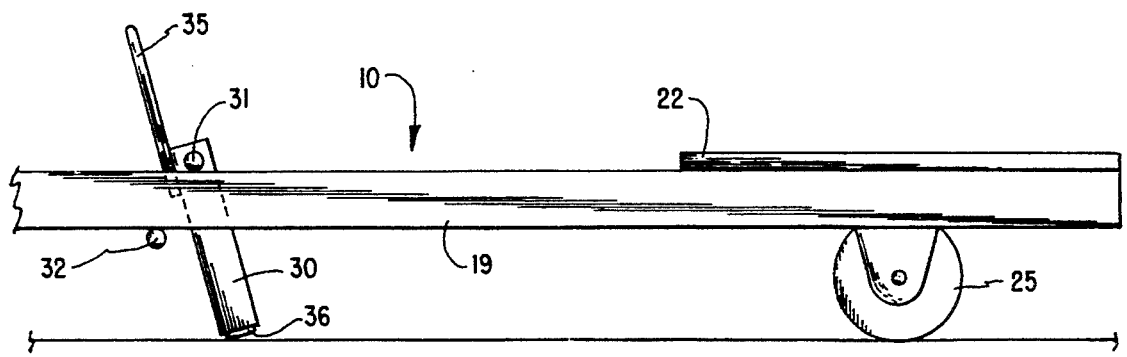
FIG. 4 is a detailed side elevational view to an enlarged scale of the anti-kickback device in a contact position.

Briefly this invention comprises a snowmobile carrying dolly having a simple and automatic control of the rearward motion of the dolly as the snowmobile drives off the dolly.

More specifically and referring to the figures, the device comprises a T-shaped framework composed of a leg 10 and a cross member 11. The cross member 11 is formed as a rectangular frame made up of long side bars 12 which may be square tubing, angle iron or other shaped member and cross bars 13 of similar cross section. At each end of the frame member 11 are located pads 15. Ramps 16 sloping upward to the pads 15 are also preferably provided. End walls 17 may also be provided to mark the outer boundaries of the cross member.

This part of the assembly is adapted to receive the front skis of the snowmobile. The shape of the structure is common for the type of dolly envisioned.

The leg 10 is releasably joined to the cross member 11. Socket members 18 are fixed to one cross bar 13 of the cross member 11, and the side bars 19 of the leg are inserted and bolted into the sockets by bolts 20. This allows ready disassembly of the dolly for more convenient storage and especially for shipping.

Essentially this leg is also an open framework composed of side bars 19 joined together by cross members 21. A plate 22 is preferably used as a cross member at the free end of the leg 10 to provide added strength and stability.

Casters 25 are provided at the free ends of both parts of the entire framework. The casters provide for ready mobility of the frame and particularly its burden after the machine is loaded onto the dolly. However, the casters also contribute to the problem solved by the present invention. The plate 22 may also provide a mounting place for the rear casters 25.

In loading the dolly, the snowmobile is driven up to the framework with the drive belt first contacting the plate 22. As the machine moves forward, the skis engage the ramps 16 and the entire assembly climbs onto the dolly with the belt extending forward from the plate 22 a considerable distance. It should be noted that all of the driving force of the belt acts on the dolly itself, thus tending to force the dolly under the snowmobile.

Figure 5:
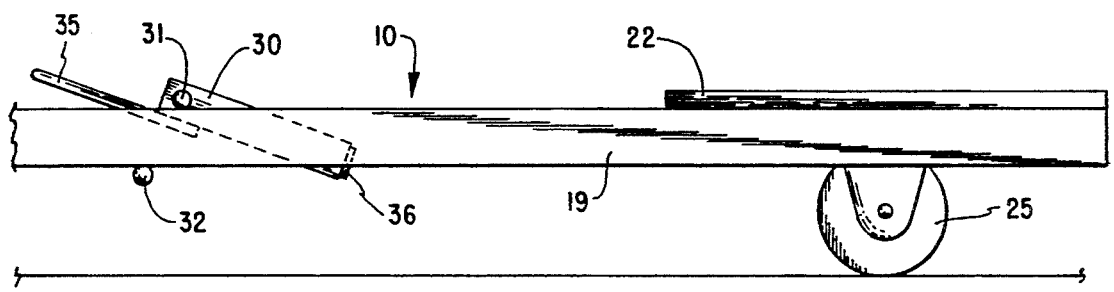
FIG. 5 is a view similar to FIG. 4 with the anti-kickback device in its free position as the snowmobile is loaded.
Figure 6:
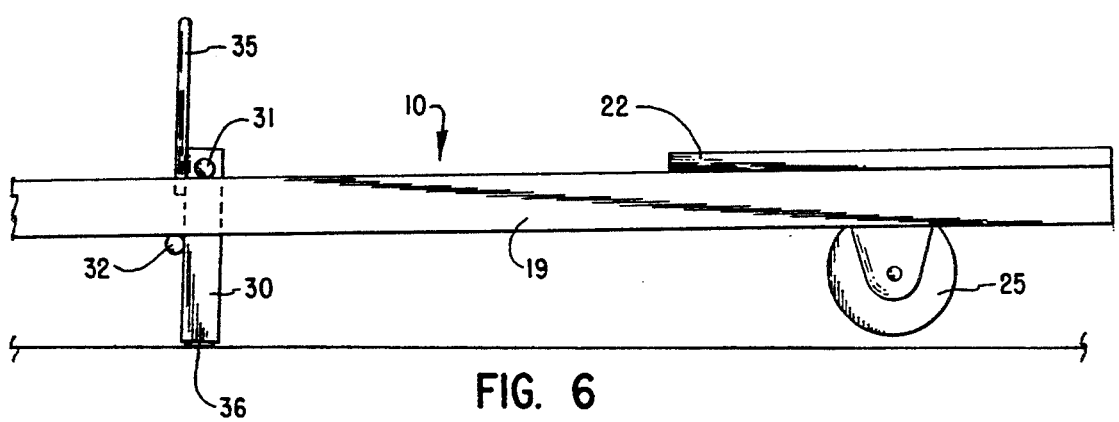
FIG. 6 is a view similar to FIGS. 4 and 5 showing the anti-kickback device in its full downward position.

Within the distance by which the belt extends past the plate 22, the present invention requires a tilting plate 30 pivoted on an axle 31 fixed to the side bars 19. Although the plate 30 may be simply a flat plate, the preferred embodiment would provide a channel shaped structure having a flat plate bordered on its edges by flanges through which the axle 31 extends. As shown in the succession of figures starting at FIG. 5 then to FIG. 4 and finally to FIG. 6, this plate can pivot from a nearly horizontal position (FIG. 5) through about 90° to a near vertical position (FIG. 6). A rod 32 transversely fixed on the leg 10 is positioned to form a stop device so that the plate 30 does not pivot past the position shown in FIG. 6. That position is preferably just slightly over the center so that it will be held by gravity.

An operating vane 35 extending along the length of the plate 30 extends upwardly from the plate 30 as shown in the figures. This vane is located where it will be contacted by the driving track of the snowmobile. It is this contact which makes for the automatic operation of the anti-kickback action of the dolly.

In operation, as the snowmobile drives onto the dolly, the track contacts the vane 35 to tilt it forward. Such tilting causes the plate 30 to move upwards to the near horizontal position shown in FIG. 5. In this position, the casters 25 are free to roll and the assembly of the dolly and snowmobile can be moved about on the casters freely.

Unloading makes for a different problem. Because most snowmobiles have only forward powered motion, the machine is driven forward. When the driven track clears the vane 35, the heavier weight of the plate 30 causes the device to pivot downwardly to the contact position of FIG. 4. A rubberized or composition material may be used to provide a band 36 of material on the bottom of the plate 30. This band tends to prevent slippage between the plate 30 and the surface on which the assembly is then supported. Because of the non-slippage, the dolly is held in place as the snowmobile is driven off and will not be propelled across the floor or other surface to the danger of other people or material standing around. Even if there is more force than is resisted by mere contact as shown in FIG. 4, the plate 30 may be pivoted against he stop 32 to give added protection. In this position, shown in FIG. 6, the casters 25 on the leg 10 will ordinarily be raised from the floor, thus adding the full weight of the leg 10 onto the plate 30 and increasing the friction between the floor and the plate 30 to provide added force holding the dolly in place.

In reloading the dolly, as the driven belt again contacts the vane 35, the plate 30 will again be pivoted upward so that the dolly again will rest on the casters and be readily moveable.

I claim as my invention:

1. In combination a snowmobile having a pair of substantially parallel front skis and a rear driven track, and a dolly adapted to rest on a surface and comprising a T-shaped frame having a cross member and a leg, said cross member having pads at each end of said member for receiving said skis, said leg being adapted to receive said track, anti-kickback means movably mounted on said leg whereby contact between said anti-kickback means and said track will hold said anti-kick back means out of contact with said surface, release of said contact between said anti-kickback means and said track being effective to cause said anti-kickback means to engage said surface and thereby to inhibit movement of said dolly relative to said surface.

2. The combination of claim 1 in which casters are mounted at the free ends of said cross member and said leg creating free mobility of said dolly on said surface, said anti-kickback means being adapted by contact with said surface to create frictional resistance to said free mobility.

3. The combination of claim 2 in which said leg is moveably attached to said cross member at the juncture of said leg and said cross member.

4. The combination of claim 2 in which said leg comprises a frame having side bars, said anti-kickback means including an axle fixed to said bars and a plate means pivotally journalled on said axle and being pivoted between a position free of said surface to a position in frictional engagement with said surface.

5. The combination of claim 4 in which upright means is attached to said plate means and extends above said leg in position to be engaged by said track when said snowmobile is on said dolly.

6. The combination of claim 4 in which a resilient pad is fixed to an edge of said plate means which is positioned to contact said surface to create friction between said plate means and said surface.

7. The combination of claim 4 in which said plate means includes a plate having a lower edge covered with resilient material adapted to cause frictional contact with said surface, said plate being located to pivot downwardly from said axle, a vane attached to said plate and extending upwardly from said axle into the normal path of said track on the snowmobile, said plate being of such weight as to over balance said vane so that the normal, gravity-induced position of said plate is downward into contact with said surfaces.

* * * * *